Inventor
Paul R. Yates
By Bailey & Larson
Attorneys

Inventor
Paul R. Yates
By Bailey & Larson
Attorneys

Patented Apr. 21, 1936

2,038,466

UNITED STATES PATENT OFFICE 2,038,466

FLEXIBLE COUPLING

Paul R. Yates, Pampa, Tex.

Application November 9, 1933, Serial No. 697,348
Renewed February 26, 1936

6 Claims. (Cl. 64—96)

My invention relates to flexible couplings and more particularly to power transmitting couples of this type.

The primary object of my invention is to provide a simple and reliable coupling of this type.

More particularly, I provide an arrangement in which the coupling elements are resiliently mounted so as to allow deflections between the shafts to be coupled, while preserving the coupling action at all times. Furthermore, the resilient action is such as to resist improper and undesirable displacements of the coupling elements by centrifugal force.

A further object is to provide a coupling of this type in which a limited amount of free relative longitudinal movement between the shafts is permitted while still maintaining a coupling action.

More specifically, I provide coupling balls which are located in bores at angularly spaced points around the main coupling member, these balls engaging in grooves in the shaft elements. Springs located in the bores press the balls radially inward into the grooves, so that a constant connection is preserved.

Further objects and advantages of my invention will appear more fully from the following description when taken in conjunction with the accompanying drawings which form a part thereof.

Figure 1:
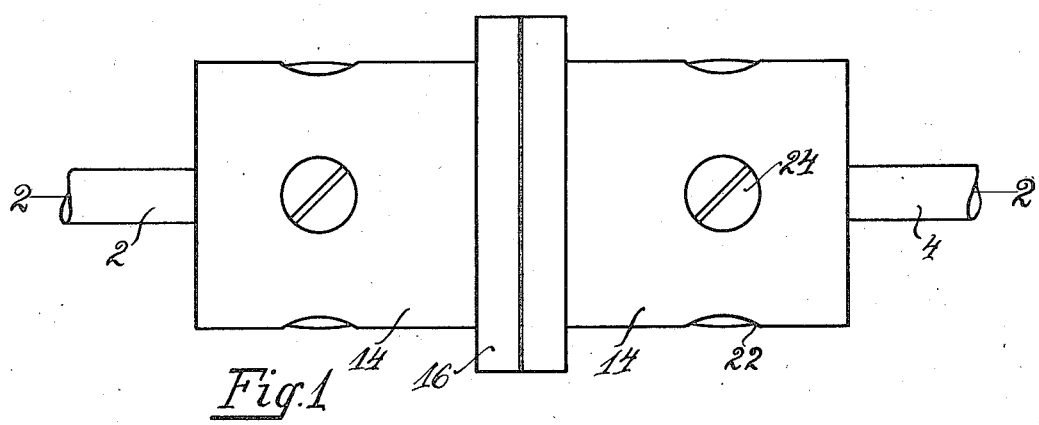
Fig. 1 shows my coupling in side elevation.

The invention couples two shafts 2 and 4 so as to transmit torque therebetween while permitting deviations between the axes of the shafts. On the abutting ends of the shafts sleeves 6 are secured by means of pins 8 or in some other manner. The outer ends of the sleeves are provided with circular flanges 10 while at their inner ends are formed grooves 12 at angularly spaced points. These grooves extend to the inner ends of the sleeves.

The main coupling member consists of two cylindrical elements 14 having abutting flanges 16 so that they can be secured together by bolts 18. The inner bores of the elements 14 are slightly larger than the sleeves 6 so as to allow the shafts to rock. At their abutting ends the bores are enlarged to provide a space 20 for receiving the flanges 10. This space is somewhat wider than the combined thickness of the flanges.

At angularly spaced points around the elements 14 are internally threaded bores 22. Plugs 24 are threaded in these bores, the inner ends of these plugs being provided with recesses 26. Ball holding elements or blocks are provided, having stems 30 slidably guided in the bores and heads 32, the faces of which are curved to fit balls 34 which form the coupling elements. Coil springs 36 within the bores act to press the balls into coupling position.

It should be quite evident that the balls 36 will engage the sides of grooves 12 and bores 22 and will thus couple each shaft to the main coupling element, so that torque will be transmitted. At the same time, if one of the shafts gets out of line, the balls will be displaced against the action of springs 36 and will permit the shafts to tilt. Other balls will, however, be pressed radially inward by the springs. By providing a number of balls at angularly displaced positions, some of them will be in precisely the proper driving relation and the device will therefore transmit torque at all times. In addition, the length of the grooves permits some endwise movement between the shafts.

The ease of assembly of my arrangement is obvious and no description thereof appears to be necessary. Only the release of bolts 18 is required to uncouple the shafts. The tension of springs 36 may be adjusted by turning plugs 24.

Figure 2:
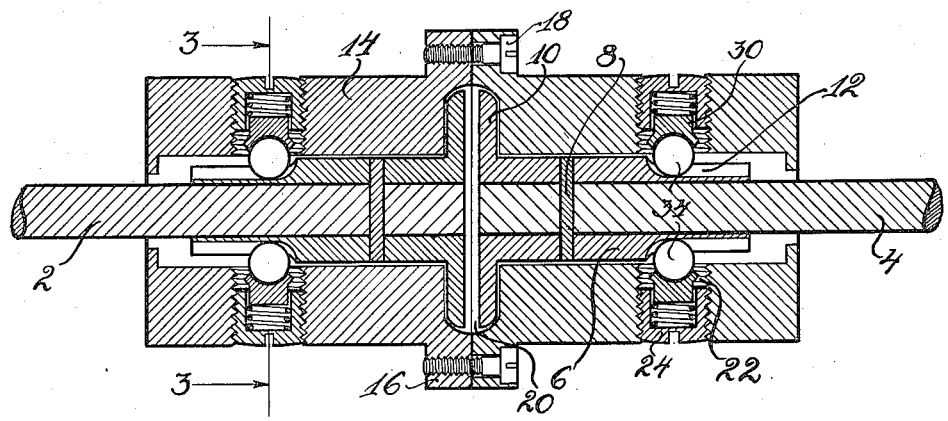
Fig. 2 is a cross section on the line 2—2 of Fig. 1.
Figure 3:
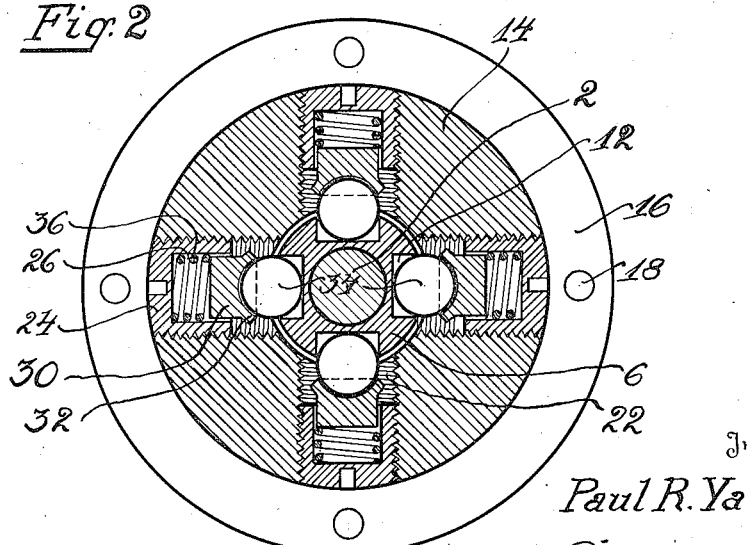
Fig. 3 is a cross section on the line 3—3 of Fig. 2.
Figure 4:
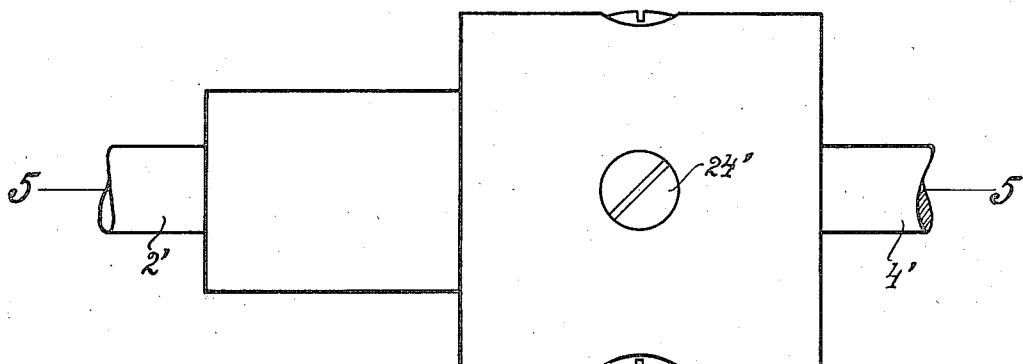
Fig. 4 is a side elevation of a modified form of my invention.
Figure 5:
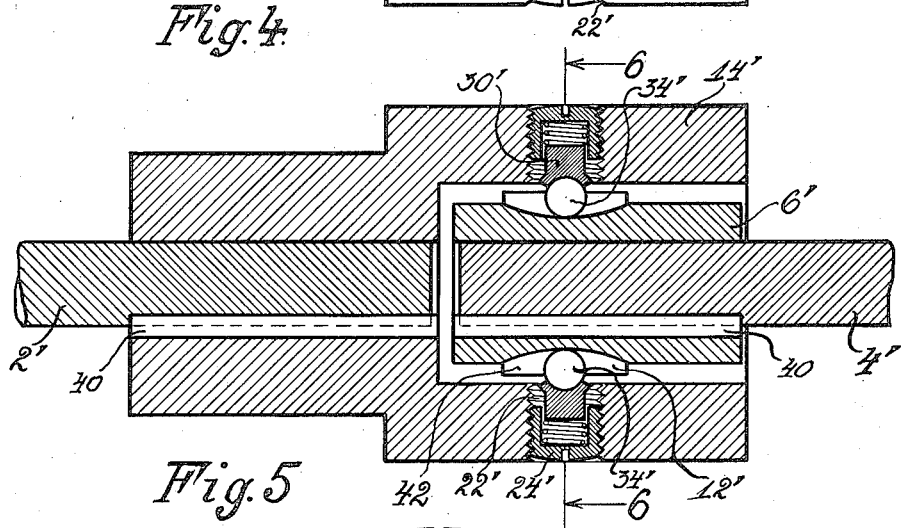
Fig. 5 is a cross section on the line 5—5 of Fig. 4.
Figure 6:
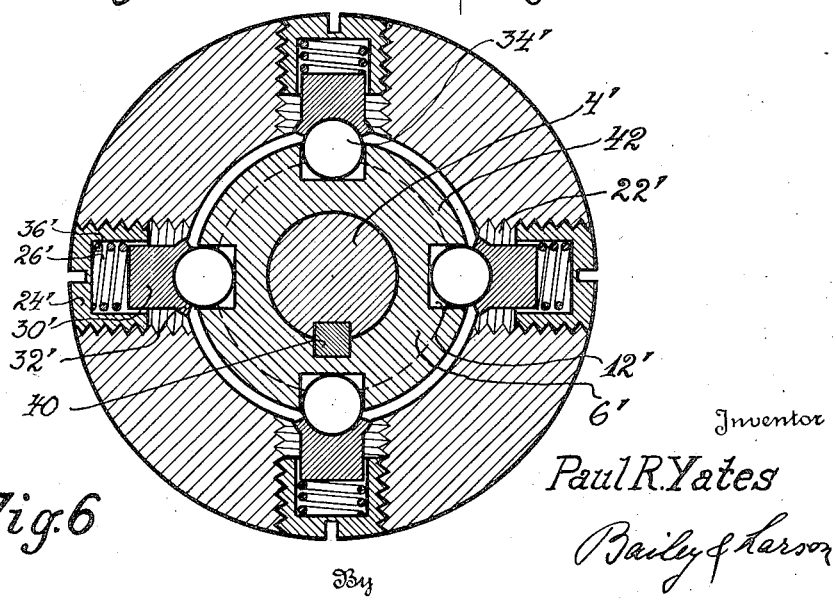
Fig. 6 is a cross section on the line 6—6 of Fig. 5.

Figs. 4 to 6 show a modified form of the coupling in which only one set of ball members is used. An outer member 14' is secured to the shaft 2' and within a recess in this fits a sleeve 6' secured on the shaft 4'. The members 6' and 14' are fixed on the shafts by keys 40. In openings 22' in the outer member 14' are threaded the plugs 24'. The ball holders having stems 30' are slidably guided in the bores 26' of the plugs. These ball holding blocks are provided with heads 32' having faces fitting the balls 34' which form the coupling element. Coil springs 36' press the balls into coupling position. This arrangement is similar to that shown in Figs. 1 to 3.

The sleeve 6' has a circular raised portion 42 through which are cut grooves 12' having rounded bottoms. The bores 34' engage in these grooves. It is quite obvious that, since the diameter of the sleeve 6' is considerably less than the internal diameter of the recess in the member 14', the shaft 4' can rock with respect to the shaft 2'. During such rocking movement, however, torque will be transmitted through the balls 34' in the same manner as in Figs. 1 to 3. The curvature of the bottoms of the slots 12' prevents the withdrawal of the sleeve 6' from the recess and thereby locks the shafts against longitudinal separation.

While I have described herein some embodiments of my invention, I wish it to be understood that I do not intend to limit myself thereby except within the scope of the appended claims.

I claim:

1. A flexible coupling for shafts, comprising a main coupling member having an internal bore and recesses opening into said bore, coupling members in said recesses, and elements on the abutting ends of said shafts having grooves therein open at the inner ends of the elements and ending at points spaced from the outer ends thereof, said coupling members engaging in said grooves.

2. In a flexible shaft coupling, elements on the shafts having recesses therein, a main coupling member surrounding said elements and having radial bores, balls mounted in said bores, plugs threaded in said bores, and spring means between said plugs and balls in said bores engaging said balls and urging the same radially inwardly to engage said recesses, said recesses comprising grooves extending from points intermediate the lengths of said elements to the inner ends thereof.

3. In a flexible shaft coupling, elements on the abutting ends of the shafts having flanges at their outer ends in planes transverse to the axes of the shafts, a main coupling member having a central longitudinal bore composed of end portions of less diameter than said flanges and a central portion of enlarged diameter within which said flanges are located, and resilient means in said end portions coupling said elements flexibly to said member.

4. In a flexible shaft coupling, elements on the abutting ends of the shafts having flanges at their outer ends in planes transverse to the axes of the shafts, a main coupling member having a central longitudinal bore composed of end portions of less diameter than said flanges and a central portion of enlarged diameter within which said flanges are located, the end portions of said member having radial bores therein, plugs threaded in said bores, balls mounted in said bores, and said elements having longitudinal grooves therein engaging said balls.

5. In a flexible shaft coupling, elements on the abutting ends of the shafts having flanges at their outer ends in planes transverse to the axes of the shafts, a main coupling member having a central longitudinal bore composed of end portions of less diameter than said flanges and a central portion of enlarged diameter within which said flanges are located, the end portions of said member having radial bores therein, plugs threaded in said bores, balls mounted in said bores, springs in said bores between said plugs and balls pressing said balls radially inward, and said elements having longitudinal grooves therein engaging said balls.

6. In a flexible shaft coupling, elements on the abutting ends of the shafts having flanges at their outer ends in planes transverse to the axes of the shafts, a main coupling member having a central longitudinal bore composed of end portions of less diameter than said flanges and a central portion of enlarged diameter within which said flanges are located, the end portions of said member having radial bores therein, plugs threaded in said bores, balls mounted in said bores, said plugs having recesses therein, blocks having stems slidably guided in said recesses and heads engaging said balls, springs in said recesses behind said blocks, and said elements having longitudinal grooves therein engaging said balls, said grooves extending from points intermediate said elements to the inner ends thereof.

PAUL R. YATES.